(12) United States Patent
Tee et al.

(10) Patent No.: US 7,510,597 B2
(45) Date of Patent: Mar. 31, 2009

(54) METHOD AND SEPARATOR FOR CYCLONIC SEPARATION OF A FLUID MIXTURE

(75) Inventors: Lih-Der Tee, Rijswijk (NL); Paulus Henricus Joannes Verbeek, Rijswijk (NL)

(73) Assignee: Shell Oil Company, Houston, TX (US)

( * ) Notice: Subject to any disclaimer, the term of this patent is extended or adjusted under 35 U.S.C. 154(b) by 279 days.

(21) Appl. No.: 10/593,123

(22) PCT Filed: Mar. 17, 2005

(86) PCT No.: PCT/EP2005/051227

§ 371 (c)(1),
(2), (4) Date: Sep. 18, 2006

(87) PCT Pub. No.: WO2005/089950

PCT Pub. Date: Sep. 29, 2005

(65) Prior Publication Data

US 2008/0251469 A1 Oct. 16, 2008

(30) Foreign Application Priority Data

Mar. 19, 2004 (EP) ................................. 04101155

(51) Int. Cl.
*B01D 45/01* (2006.01)
(52) U.S. Cl. ............................. 95/271; 55/423; 55/450; 55/459.1
(58) Field of Classification Search ................... 55/421, 55/423, 459.1, 466; 95/261, 271; 96/208, 96/209, 216, 408
See application file for complete search history.

(56) References Cited

U.S. PATENT DOCUMENTS 1,863,111 A * 6/1932 Greve .......................... 96/216

(Continued)

FOREIGN PATENT DOCUMENTS

CA 1181700 1/1985 ................ 183/116

(Continued)

*Primary Examiner*—Duane Smith
*Assistant Examiner*—Sonji Turner
(74) *Attorney, Agent, or Firm*—William E. Hickman

(57) ABSTRACT

A method for cyclonic separation of gaseous and liquid fractions from a multiphase fluid mixture comprises: providing a cyclonic separation vessel (1) having a bottom section (4), a top section (3) and a tubular midsection (2), which is co-axial to a central axis (5); injecting the multiphase fluid mixture into the vessel via an inlet conduit (6) which has a substantially tangential orientation relative to said central axis (5); inducing the fluid mixture to swirl within said tubular midsection (2) of the vessel at such a speed that liquid and gaseous fractions are separated by cyclonic separation and gravity forces induce the liquid fraction to drop to the bottom section (4) of the vessel; —removing the gaseous fraction from the interior of the top section of the vessel via a gas outlet conduit (8) which has an entrance opening which is located at or near the central axis (5); removing the liquid fraction from the interior of the bottom section (4) of the vessel via a plurality of liquid outlet openings (11) that are located at different vertical levels and through which liquid is discharged into a liquid outlet conduit (10) such that liquid components with different densities are mixed into a substantially homogeneous liquid fraction and the formation of high density and low density liquid slugs in said conduit (10) is mitigated.

7 Claims, 1 Drawing Sheet

U.S. PATENT DOCUMENTS

| | | | |
|---|---|---|---|
| 2,005,305 A * | 6/1935 | Wagner | 55/343 |
| 2,790,554 A * | 4/1957 | Work | 210/294 |
| 3,151,961 A * | 10/1964 | Blackmore et al. | 96/210 |
| 3,771,290 A * | 11/1973 | Stethem | 96/210 |
| 4,225,325 A * | 9/1980 | Diehl et al. | 96/208 |
| 4,853,010 A * | 8/1989 | Spence et al. | 96/52 |
| 5,203,891 A * | 4/1993 | Lema | 96/210 |
| 5,338,341 A | 8/1994 | Mazzei et al. | 96/208 |
| 5,622,545 A * | 4/1997 | Mazzei et al. | 96/210 |
| 5,649,998 A * | 7/1997 | Ungerer et al. | 96/209 |
| 5,755,965 A * | 5/1998 | Reiber | 210/512.1 |
| 6,322,616 B1 * | 11/2001 | Kennedy et al. | 96/208 |
| 6,364,940 B1 * | 4/2002 | Prueter et al. | 95/261 |
| 6,409,808 B1 * | 6/2002 | Chamberlain et al. | 96/182 |
| 6,752,860 B1 * | 6/2004 | Hoydal et al. | 96/157 |
| 7,022,153 B2 * | 4/2006 | McKenzie | 55/423 |

FOREIGN PATENT DOCUMENTS

| | | |
|---|---|---|
| WO | 2000027949 | 5/2000 |
| WO | 2000074815 | 12/2000 |
| WO | 2000076815 | 12/2000 |
| WO | 2003055575 | 7/2003 |

* cited by examiner

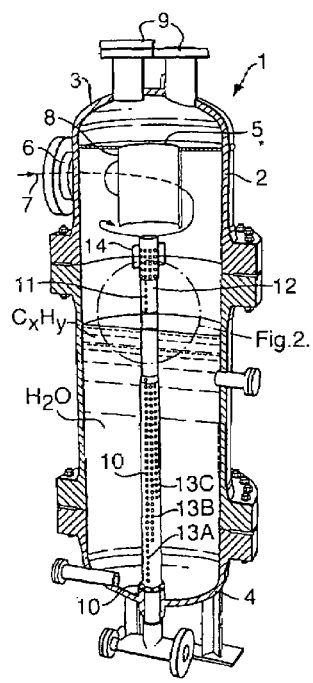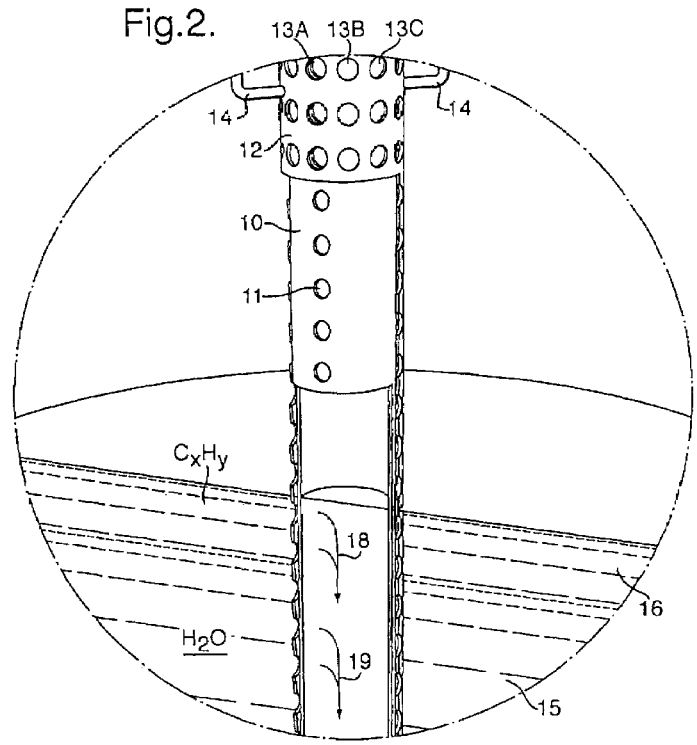

METHOD AND SEPARATOR FOR CYCLONIC SEPARATION OF A FLUID MIXTURE

PRIORITY CLAIM

The present application claims priority on European Patent Application 04101155.2 filed Mar. 19, 2004.

FIELD OF THE INVENTION

Background of the Invention

The invention relates to a method and separator for cyclonic separation of a fluid mixture.

Such a method and apparatus are known from International patent applications WO 00/74815 and WO 00/055575.

The known separators comprise a cyclonic separation vessel that provides a vertical vortex tube into which a multiphase fluid mixture is injected via a tangential inlet conduit. The tangential injection induces the fluid mixture to swirl within the vortex tube such that centrifugal forces induce a cyclonic separation between a liquid fraction which forms a liquid film at the inner surface of the vortex conduit and a gaseous fraction which is concentrated at or near a central axis of the vortex tube.

In the known separators the gaseous fraction is discharged via a central gas outlet which passes through the top section of the separation vessel at or near said central axis, whereas the liquid fraction is discharged via one or more liquid outlets that are located near the bottom of the separation vessel.

In the separator known from WO 03/055575 the liquid fraction is collected in a liquid separation tank at the bottom of the vessel in which heavy and lighter liquid fractions, such as water and oil or condensates, are separated by gravity separation and are discharged via separate liquid outlet conduits for further separation.

In the separator known from WO 00/74815 the liquid fraction is discharged via an inwardly tapered liquid collecting section into a central liquid outlet at the bottom of the cyclonic separation vessel. The liquid fraction then flows into a gravity separation tank via a perforated plate to create a uniform velocity distribution of the liquid stream that flows through the separation tank, which enhances the separation of the liquid mixture into water and oil.

A disadvantage of this known separator is that when liquid accumulates in the inwardly tapered liquid collecting section the high density and low density liquid fractions tend to be discharged in slugs into the central outlet. This is caused by the formation of a high density liquid layer at the bottom and a low density liquid layer at the top of the tapered liquid collecting section so that initially only the high density fraction will be discharged into the liquid outlet at the bottom until the interface between the high and low density fraction has reached the liquid outlet and a slug of low density liquid is discharged. Then the further supply of high density liquid will form again a high density liquid layer at the bottom and the above mentioned cycle of discharging alternating high density and low density slugs via the central liquid outlet at the bottom will repeat itself automatically. The alternating discharge of high and low density liquid slugs complicates the separation of high and low density liquids in the liquid separation facilities for separating the low and high density liquid fractions that may include osmotic or other membranes, gravity or cyclonic separation vessels and/or centrifuges.

In the separator known from WO03/055575 the low and high density liquid fractions are separated in a gravity separation tank at the bottom of the vortex tube and discharged via separate low and high density liquid outlets, but this creates a large, complex, heavy and expensive piece of equipment, in particular if it is constructed as a high pressure vessel.

SUMMARY OF THE INVENTION

In accordance with the invention there is provided a method for cyclonic separation of gaseous and liquid fractions from a multiphase fluid mixture, the method comprising:

providing a cyclonic separation vessel having a bottom section, a top section and a tubular mid-section, which is co-axial to a central axis;

injecting the multiphase fluid mixture into the vessel via an inlet conduit which has a substantially tangential orientation relative to said central axis;

inducing the fluid mixture to swirl within said tubular mid-section of the vessel at such a speed that liquid and gaseous fractions are separated by cyclonic separation and gravity forces induce the liquid fraction to drop to the bottom section of the vessel;

removing the gaseous fraction from the interior of the top section of the vessel via a gas outlet conduit which has an entrance opening which is located at or near the central axis;

removing the liquid fraction from the interior of the bottom section of the vessel via a plurality of liquid outlet openings that are located at different vertical levels and through which liquid is discharged into a liquid outlet conduit such that liquid components with different densities are mixed into a substantially homogeneous liquid fraction.

Preferably, the liquid outlet openings are formed by axially spaced perforations of a perforated inflow section of the liquid outlet conduit, which section extends in upward direction into a lower part of the interior of the separation vessel and is provided with a series of longitudinally spaced perforations.

It is furthermore preferred that the perforated inflow section of the liquid outlet conduit comprises a row of longitudinally spaced perforations and is co-axial to a watercut control conduit, which is rotatable relative to the fixed lower section and is provided with several rows of longitudinally spaced perforations which have different lengths such that different amounts of perforations of the liquid outlet and watercut control conduit are aligned in response to rotation of the watercut control conduit relative to the liquid outlet conduit.

The perforated inflow section of the liquid outlet conduit may be substantially co-axial to the central axis of the tubular mid-section of the separation vessel, which may have a substantially vertical orientation.

The cyclonic separator according to the invention comprises:

a cyclonic separation vessel having a bottom section, at top section and tubular mid-section which is co-axial to a central axis;

an inlet conduit for injecting the multiphase fluid mixture into the vessel in a substantially tangential direction relative to said central axis;

a gas outlet conduit having an entrance opening which is located at or near the central axis for removing the gaseous fraction from the top section of vessel;

a plurality of liquid outlet openings for removing the liquid fraction from the interior of the bottom section of the vessel into a liquid outlet conduit, which openings are located at different vertical levels and through which in use liquid is discharged into a liquid outlet conduit such that liquid components with different densities are mixed into a substantially homogeneous liquid fraction.

BRIEF DESCRIPTION OF THE DRAWINGS

FIG. 1 is a schematic three dimensional sectional view of a cyclonic gas-liquid separation vessel according to the invention, which is provided with a perforated liquid outlet conduit; and FIG. 2 shows in larger detail an upper section of the perforated liquid outlet conduit of the cyclonic separation vessel of FIG. 1 in which part of the surrounding watercut control conduit has been cut away.

DETAILED DESCRIPTION OF THE INVENTION

FIG. 1 shows a separation vessel 1 for cyclonic separation of gaseous and liquid fractions of a multiphase fluid mixture in accordance with the invention.

The vessel 1 comprises a tubular mid-section 2, a dome-shaped top section 3 and an inwardly tapered bottom section 4.

The tubular-mid section 2 is co-axial to a substantially vertical central axis 5. A multiphase fluid mixture comprising gaseous and liquid fractions is injected via a fluid inlet conduit 6 into the tubular mid-section 2 in a substantially tangential direction relative to the central axis 5 as illustrated by arrow 7. Arrow 7 also illustrates how the injected fluid is induced to swirl in downward direction along the inner surface of the tubular mid-section 2 such that the gaseous and liquid fractions are separated by cyclonic separation and the heavy liquid fraction forms a liquid film flowing along said inner surface and the light gaseous fraction is concentrated in the region of the central axis 5.

The dome-shaped top section 3 is provided with a gas outlet conduit 8, which is co-axial to the central axis 5 and two gas outlet tubes 9 for discharge of the dried gaseous fraction from the interior of the vessel 1.

A perforated liquid outlet conduit 10 comprising a single row of axially spaced perforations 11 extends upwardly into the interior of the vessel 1. The liquid outlet conduit 10 is co-axial to the central axis 5 and is fixedly secured to the bottom section 4 of the vessel 1. A watercut control conduit 12 is arranged co-axially arranged around the liquid outlet conduit 10.

The watercut control conduit 12 comprises several parallel rows 13A, 13B and 13C of axially spaced perforations that are arranged at the same axial spacings as the axially spaced perforations 11 of the liquid outlet conduit 10. In the position shown the longest row of perforations 13A is aligned with the perforations 11 so that liquid from all levels in the separation vessel 1 seeps into the liquid outlet conduit 10. The watercut control conduit 12 is equipped with a pair of handles 14 which allow manual rotation of the watercut control conduit 12 relative to the liquid outlet conduit 10 during inspection or maintenance of the vessel 1. As a result of such rotation a shorter row of perforations 13B or 13C may be brought into alignment with the perforation 11 of the liquid outlet conduit 10. These shorter rows of perforations 13B or 13C start at a higher level above the bottom of the vessel 1. A pin (not shown) may be inserted into a pair of aligned perforations 11 and 13A,B, or C to fix the position of the watercut control conduit 12 relative to the liquid outlet conduit 10.

The liquid that accumulates at the bottom of the vessel 1 is at least partially separated by gravity separation into a high density liquid fraction 15, such as water ($H_2O$), and a low density liquid fraction 16 that floats on top of the high density fraction 15. The low density fraction 16 may comprise hydrocarbons ($C_xH_y$) such as oil, condensate, hydrates, wax and paraffins.

Since the perforations 13A extend along the entire height of the liquid column in the vessel 1 low density liquid fraction 16 will flow into the liquid outlet conduit 10 as illustrated by arrow 18 simultaneously with the high density liquid fraction 15 as illustrated by arrow 19. The low and high density liquid fractions 16 and 15 are mixed into a substantially homogeneous liquid mixture in the interior of the liquid outlet conduit 10. This mixture is substantially free of alternating slugs of high density and low density liquid fractions 16, 15 and can be easily separated in an osmotic, membrane, gravity, cyclone or other secondary liquid separator (not shown). The absence of cyclic high density and low density liquid slugs permits an optimal operation of the secondary liquid separator and saves the use of a separate slug catching device in the liquid outlet conduit 10.

The ratio between the high and low density fractions 15 and 16, or in other words the watercut, of the liquid mixture that flows into the liquid outlet conduit 10 can be adjusted by rotating the watercut control conduit 12 such that a shorter row of perforations 13B or 13C becomes aligned with the row of axially spaced perforations 11 in the liquid outlet conduit 10.

We claim:

1. A method for cyclonic separation of gaseous and liquid fractions from a multiphase fluid mixture, the method comprising:
   providing a cyclonic separation vessel having a bottom section, a top section and a tubular mid-section, which is co-axial to a central axis;
   injecting the multiphase fluid mixture into the vessel via an inlet conduit which has a substantially tangential orientation relative to said central axis;
   inducing the fluid mixture to swirl within said tubular mid-section of the vessel at such a speed that liquid and gaseous fractions are separated by cyclonic separation and gravity forces induce the liquid fraction to drop to the bottom section of the vessel;
   removing the gaseous fraction from the interior of the top section of the vessel via a gas outlet conduit which has an entrance opening which is located at or near the central axis; and
   removing the liquid fraction from the interior of the bottom section of the vessel via a plurality of liquid outlet openings that are located at different vertical levels and through which liquid is discharged into a liquid outlet conduit such that liquid components with different densities are mixed into a substantially homogeneous liquid fraction.

2. The method of claim 1, wherein the liquid outlet openings are formed by axially spaced perforations of a perforated inflow section of the liquid outlet conduit, which section extends in upward direction into a lower part of the interior of the separation vessel and is provided with a series of longitudinally spaced perforations.

3. The method of claim 2, wherein the perforated inflow section of the liquid outlet conduit comprises a row of longitudinally spaced perforations and is co-axial to a watercut control conduit, which is rotatable relative to the fixed lower section and is provided with several rows of longitudinally spaced perforations which have different lengths such that different amounts of perforations of the liquid outlet and watercut control conduit are aligned in response to rotation of the watercut control conduit relative to the liquid outlet conduit.

4. The method of claim 2, wherein the perforated inflow section of the liquid outlet conduit is substantially co-axial to the central axis of the tubular mid-section of the separation vessel.

5. The method of claim 1, wherein the central axis has a substantially vertical orientation.

6. A separator for cyclonic separation of gaseous and liquid fractions from a multiphase fluid mixture, comprising:
- a cyclonic separation vessel having a bottom section, a top section and tubular mid-section which is co-axial to a central axis;
- an inlet conduit for injecting the multiphase fluid mixture into the vessel in a substantially tangential direction relative to said central axis;
- a gas outlet conduit having an entrance opening which is located at or near the central axis for removing the gaseous fraction from the top section of vessel; and
- a plurality of liquid outlet openings for removing the liquid fraction from the interior of the bottom section of the vessel into a liquid outlet conduit, which openings are located at different vertical levels and through which in use liquid is discharged into a liquid outlet conduit such that liquid components with different densities are mixed into a substantially homogeneous liquid fraction, wherein the liquid outlet openings are formed by axially spaced perforations of a perforated inflow section of the liquid outlet conduit extending in upward direction into a lower part of the interior of the separation vessel, and wherein the perforated inflow section of the liquid outlet conduit comprises a row of longitudinally spaced perforations and is co-axial to a watercut control conduit which is rotatable relative to the liquid outlet conduit and is provided with several rows of longitudinally spaced perforations, said rows having different lengths such that different amounts of perforations of the liquid outlet conduit and watercut control conduit are aligned in response to rotation of the watercut control conduit relative to the liquid outlet conduit.

7. The separator of claim 6, wherein the perforated inflow section of the liquid outlet conduit is substantially co-axial to the central axis of the tubular mid-section of the separation vessel.

* * * * *